United States Patent
Tedjamulia et al.

(10) Patent No.: US 9,619,834 B2
(45) Date of Patent: Apr. 11, 2017

(54) SOCIAL COMMERCE RELATIONSHIP MANAGEMENT SYSTEM

(75) Inventors: Steven Tedjamulia, Austin, TX (US); Ronald Vincent Rose, Austin, TX (US); Manish C. Mehta, Austin, TX (US)

(73) Assignee: Dell Products L.P., Round Rock, TX (US)

(*) Notice: Subject to any disclaimer, the term of this patent is extended or adjusted under 35 U.S.C. 154(b) by 854 days.

(21) Appl. No.: 12/951,462

(22) Filed: Nov. 22, 2010

(65) Prior Publication Data

US 2012/0130861 A1    May 24, 2012

(51) Int. Cl.
G06Q 30/00  (2012.01)
G06F 17/30  (2006.01)
G06Q 30/06  (2012.01)
G06Q 10/10  (2012.01)
G06Q 30/02  (2012.01)
G06Q 50/00  (2012.01)

(52) U.S. Cl.
CPC ......... *G06Q 30/0641* (2013.01); *G06Q 10/10* (2013.01); *G06Q 30/02* (2013.01); *G06Q 30/0601* (2013.01); *G06Q 50/01* (2013.01)

(58) Field of Classification Search
CPC .................. G06Q 30/0641; G06Q 30/0601
See application file for complete search history.

(56) References Cited

U.S. PATENT DOCUMENTS

| | | | |
|---|---|---|---|
| 2007/0094076 A1* | 4/2007 | Perkowski et al. | 705/14 |
| 2008/0189188 A1* | 8/2008 | Morgenstern | 705/26 |
| 2008/0189189 A1* | 8/2008 | Morgenstern | 705/26 |
| 2008/0229215 A1* | 9/2008 | Baron et al. | 715/751 |
| 2009/0094134 A1* | 4/2009 | Toomer et al. | 705/26 |
| 2009/0106085 A1* | 4/2009 | Raimbeault | 705/10 |
| 2009/0172783 A1* | 7/2009 | Eberstadt | 726/4 |
| 2009/0254529 A1* | 10/2009 | Goldentouch | 707/3 |
| 2011/0161150 A1* | 6/2011 | Steffens et al. | 705/14.25 |
| 2013/0173734 A1* | 7/2013 | Oteiza Lacalle . G06F 17/30867 709/207 |

* cited by examiner

*Primary Examiner* — Kathleen Palavecino
(74) *Attorney, Agent, or Firm* — Terrile, Cannatti, Chambers & Holland, LLP; Stephen A. Terrile

(57) ABSTRACT

A method and system is disclosed for conducting electronic commerce within a social media environment. A user performs social media interactions within a social media environment and elects to consider purchasing a vendor's product that is referenced in an activity stream. The user then proceeds to a social commerce site while they are still within the social media environment. The user then accesses the social commerce site and performs social commerce operations, such as selecting and purchasing the product referenced in the activity stream.

22 Claims, 6 Drawing Sheets

US 9,619,834 B2

SOCIAL COMMERCE RELATIONSHIP MANAGEMENT SYSTEM

BACKGROUND OF THE INVENTION

Field of the Invention

Embodiments of the invention relate generally to information handling systems. More specifically, embodiments of the invention provide a method and system for conducting electronic commerce within a social media environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Such information handling systems have been instrumental in the widespread adoption of electronic commerce (ecommerce), which enables organizations to communicate, advertise, market and sell their products and services over computer networks such as the Internet. These same information handling systems have been just as instrumental in the rapid adoption of social media into the mainstream of everyday life. Social media commonly refers to the use of web-based technologies for the creation and exchange of user-generated content for social interaction. As such, it currently accounts for approximately 22% of all time spent on the Internet.

More recently, social commerce has emerged. A subset of ecommerce, social commerce uses social interactions and user contributions to assist in the online buying and selling of products and services. More succinctly, social commerce can be thought of as the use of social media in the context of ecommerce. Examples of social commerce include customer ratings and reviews, user recommendations and referrals, private and public forums and communities, and social advertising.

Another form of social commerce is user-generated advertorial content, which provides on-line shoppers with advice from trusted individuals and assists them in finding recommended goods and services. Once restricted to ecommerce sites, such content is now beginning to be available within social media environments. However, purchasing recommended goods and services typically requires leaving the social media environment and accessing the vendor's ecommerce site. Once accessed, the user is often overwhelmed with too many choices, which can lead to confusion, indecision, and abandoned shopping carts. In view of the foregoing, there is a need to seamlessly extend social commerce to provide complete ecommerce functionality from within a social media environment.

SUMMARY OF THE INVENTION

A method and system is disclosed for conducting electronic commerce within a social media environment. In various embodiments, a social commerce relationship management system (SCRMS) is implemented to perform social commerce operations within a social media environment. In these and other embodiments, a social media community member performs social media interactions such as reading or posting comments, participating in activity streams, uploading photographs, etc.

During the course of performing social media interactions, the social media community member may elect to consider purchasing a vendor's product that is referenced in an activity stream. If so, then the social media community member proceeds to the vendor's, or a vendor affiliate's, social commerce site, while they are still performing social media interactions within the social media environment. Once the social commerce site is accessed, social commerce operations are performed, such as selecting and purchasing the vendor's product referenced in the activity stream.

In one embodiment, the social commerce site is operated as a subset of an electronic commerce site operated by the vendor. In another embodiment, the social commerce site is operated independently from an electronic commerce site operated by the vendor. In yet another embodiment, the social commerce site is configured and operated by the vendor. In still another embodiment, the social commerce site is configured by an affiliate of the vendor, but operated by the vendor on behalf of the affiliate.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system is disclosed for conducting electronic commerce within a social media environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
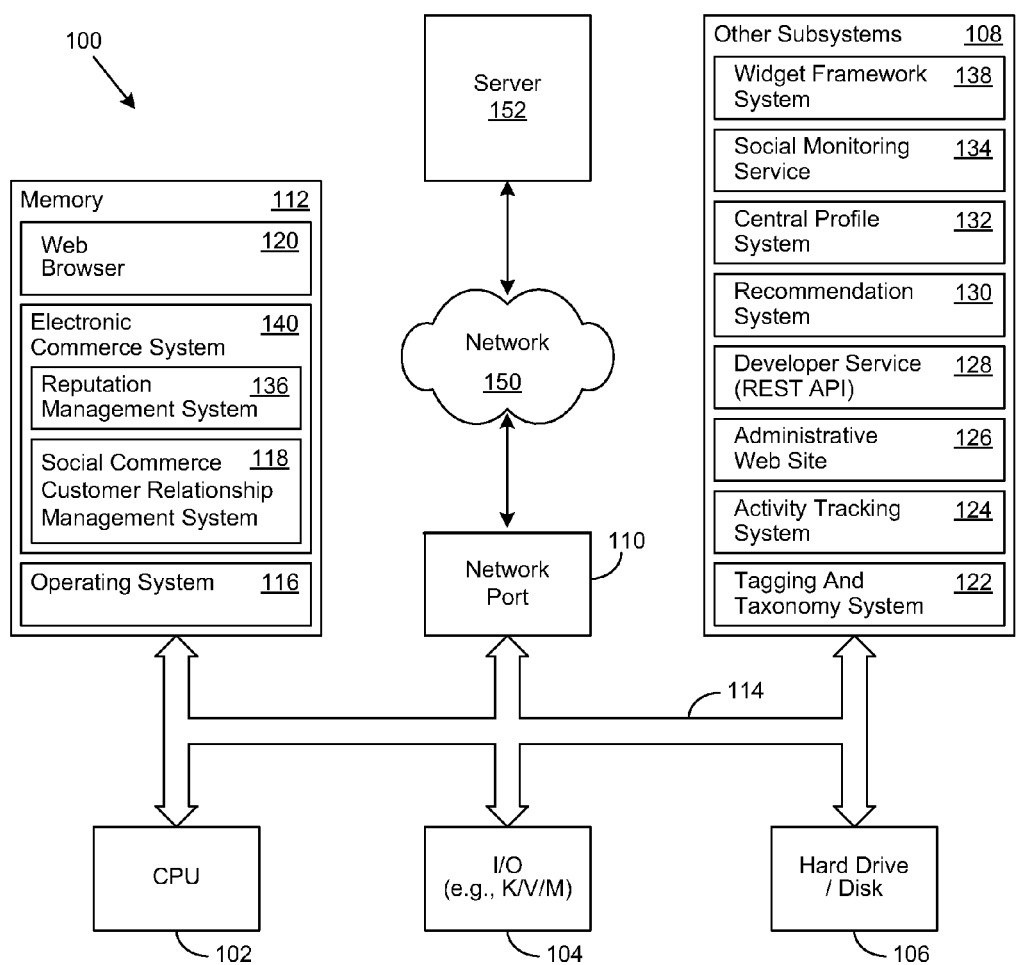
FIG. 1 is a general illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the other subsystems 108 may also comprise a tagging and taxonomy system 122, an activity tracking system 124, an administrative web site 126, a developer service 128 further comprising a Representational State Transfer (REST) application program interface (API), a recommendation system 130, a central profile system 132, a social monitoring service 134, and a widget framework system 138. In these and other embodiments, the information handling system 100 also includes network port 110 operable to connect to a network 150, which is likewise accessible by a service provider server 152. The information handling system 100 likewise includes system memory 112, which is interconnected to the foregoing via one or more buses 114. System memory 112 further comprises operating system (OS) 116, an electronic commerce system 140, and a Web browser 126. In various embodiments, the electronic commerce system 140 comprises a social commerce customer relationship management system 118 and a reputation management system 136. In one embodiment, the information handling system 100 is able to download the electronic commerce system 140, the Web browser 126, the tagging and taxonomy system 122, the activity tracking system 124, the administrative web site 126, the developer service 128, the recommendation system 130, the central profile system 132, the social monitoring service 134, and the widget framework system 138 from the service provider server 152. In another embodiment, the electronic commerce system 140, the Web browser 126, the tagging and taxonomy system 122, the activity tracking system 124, the administrative web site 126, the developer service 128, the recommendation system 130, the central profile system 132, the social monitoring service 134, and the widget framework system 138 from the service provider server 152 are provided as a service by the service provider server 152.

Figure 2:
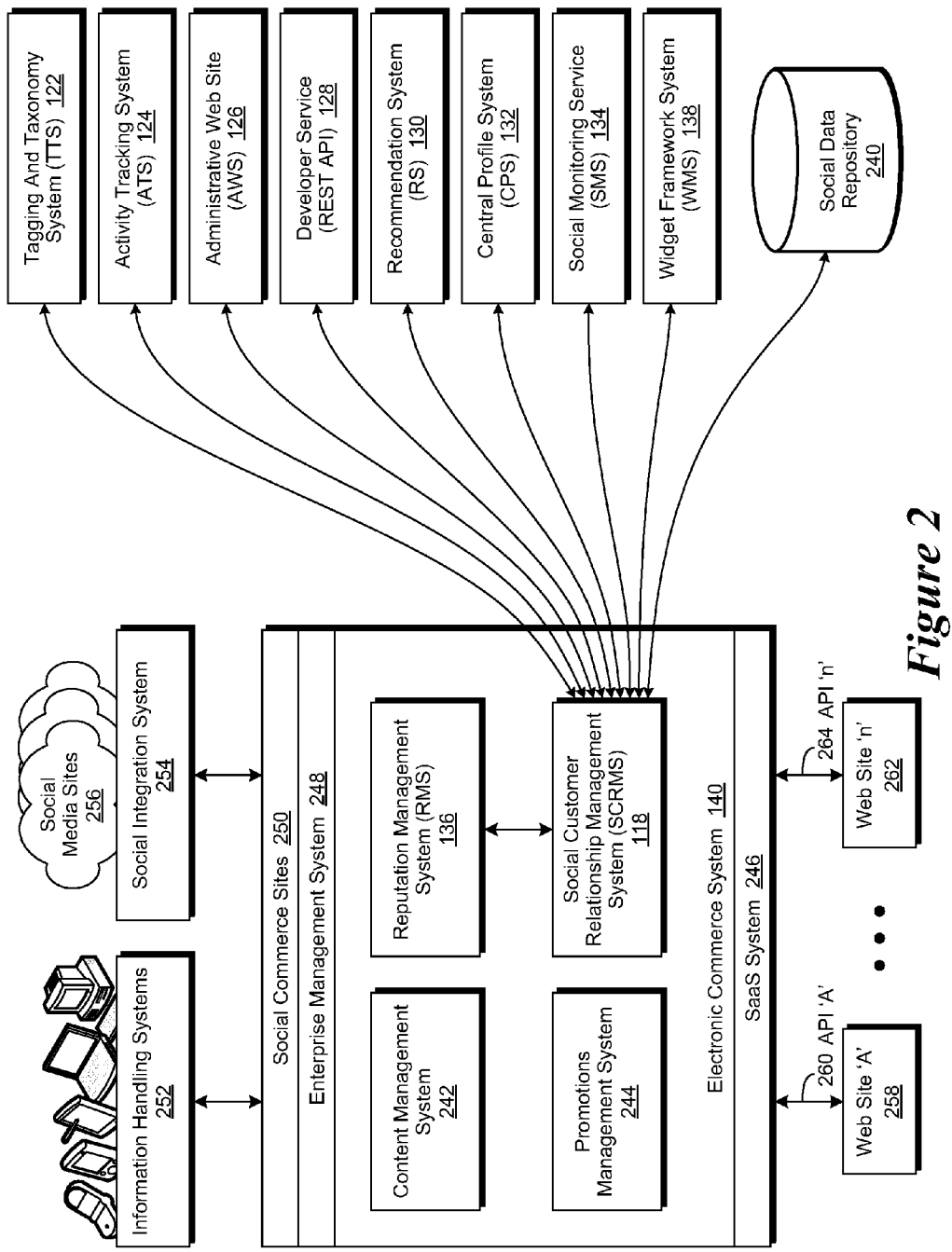
FIG. 2 is a simplified block diagram of showing the relationship between a social customer relationship management system (SCRMS) and related systems.

FIG. 2 is a simplified block diagram of showing the relationship between a social customer relationship management system (SCRMS) and related systems as implemented in accordance with an embodiment of the invention. In various embodiments, an electronic commerce (ecommerce) system 140 comprises a SCRMS 118, a reputation management system 136, a content management system 242, and a promotions management system 244. In these and other embodiments, the SCRMS 118 and the reputation management system 136 may be respectively implemented as a sub-system of the ecommerce system 140. In various other embodiments, the SCRMS 118 and the reputation management system 136 may be respectively implemented as independent systems. In various embodiments, the SCRMS 118, the reputation management system 136, the content management system 242, and the promotions management system 244 exchange data related to social commerce, as described in greater detail herein.

In various embodiments, the ecommerce system 140 provides the ability for operators of the plurality of social commerce sites to sell their products and other products through a vendor affiliate structure. In these and other embodiments, the ecommerce system 140 likewise provides the ability to keep track of vendor affiliate product shipping and fulfillment by integrating the plurality of social commerce sites 250 with the vendor's fulfillment site, such as web site 'A' 258 through 'n' 262. Likewise, the ecommerce system 140 provides the ability to track shipping and fulfillment for individual social commerce site 250 operators' own products. The ecommerce system 140 likewise provides the ability to have customers to not only purchase an individual product from an individual social commerce site 250, but to also purchase multiple products from different vendors in one shopping cart purchase at an individual social commerce site 250. Likewise, the ecommerce system 140 provides the ability to provide the option of a purchase occurring within the ecommerce system 140 or at another site, such as web site 'A' 258 through 'n' 262. In these and other embodiments, the ecommerce system 140 likewise provides the ability to manage a plurality of social commerce sites 250 for an individual operator, and also provide the ability to support multiple tenants, each of which may have different social commerce sites 250, affiliate programs, and marketplaces.

In various embodiments, the reputation management system 136 provides the ability for a plurality of social media communities to share reputation points and reputation badges, each of which are governed separately or in the same governance structure. Likewise, the reputation management system 136 provides buyers the ability to rate their experience with individual products and operators of individual social commerce sites 250. The reputation management system 140 likewise provides the ability to offer a loyalty reward program for operators of individual social commerce sites 250 across a similar or different social media site 256 to incent customers to make more purchases of products and get rewarded or recognition for the amount they spend. In these and other embodiments social media community participation is incentivized base on activity, attendance, key words used, or needed content. Likewise, a user's activity in individual social media sites 256 that are outside of the plurality of social commerce sites 250 may be rewarded while simultaneously preventing fraudulent activity by users attempting to receive rewards, improve their reputation scores, or increase incentives.

In various embodiments, the content management system 242 provides the ability for vendor content to be integrated with individual social commerce site 250 content such that any changes made to the content is synchronized. Likewise, the content management system 242 provides the ability for product prices to be synchronized in real-time between an individual social commerce site 250 and a vendor. In various embodiments, the promotions management system 244 provides the ability for a vendor to publish promotional coupons and to likewise allow operators of individual social commerce sites 250 to provide their own version of the coupon such that it can be based on time periods, purchase quantities or amounts, calendar day, country, or group purchases. Likewise, a coupon program may specify a predetermined coupon and only allow, or limit, the usage of the coupon by a predetermined user registered in the promotions management system 244.

As shown in FIG. 2, the ecommerce system 140 is coupled to an enterprise management system 248 familiar to those of skill in the art, which in turn is coupled to a plurality of social commerce sites 250, which are described in greater detail herein. In turn, the social commerce sites are accessed by a plurality of information handling systems 252 as likewise described in greater detail herein. The plurality of social commerce sites 250 are likewise coupled to a social integration system 254, which is implemented in various embodiments to provide access to a plurality of social media sites 256. The ecommerce system 140 is likewise coupled to a software as a service (SaaS) system 246, which in turn is respectively coupled to web sites 'A' 258 through 'n' 262 by application program interfaces (APIs) 'A' 260 through 'n' 264.

In various embodiments, the SCRMS 118 is implemented to enable members of a social media community to conduct social commerce operations. As used herein, social commerce refers to any activity relating to the use of social media to conducting electronic commerce operations. In these embodiments, the SCRMS 118 may interact with various other systems, including a tagging and taxonomy system 122, an activity tracking system 124, and an administrative web site 126. The SCRMS 118 may likewise interact with a developer service 128 comprising a Representational State Transfer (REST) application program interface (API), a recommendation system 130, a central profile system 132, a social monitoring service 134, and a widget framework system 138. When performing social commerce operations described in greater detail herein, the SCRMS 118 may likewise retrieve and store social data in a social data repository 240.

In theses and other embodiments, the tagging and taxonomy system 122 provides the ability for social commerce site administrators to implement predetermined product categories and taxonomies. In various embodiments, the tagging and taxonomy system 122 likewise provides these same administrators the ability to use custom-defined product categories and taxonomies. Likewise, the tagging and taxonomy system 122 provides administrators the means to integrate different product catalogs and assign them specific categories and taxonomies. In these and other embodiments, the administrators are likewise provided the ability to govern their own product catalogs, tags, taxonomies, and offer the predetermined navigation to their affiliates. In one embodiment, administrators are provided the means to present predetermined affiliates various products based on the implementation of associated tags. In another embodiment, affiliates are provided the means to provide various products to target customers based on the implementation of associated tags. In yet another embodiment, the tagging and taxonomy system 122 comprises a reporting engine operable to match custom categories with specific categories that have been created by affiliates.

In various embodiments, the activity tracking system 124 provides the means to track activities performed in the plurality of social commerce sites 250 as well as the plurality of social commerce sites 256 that are associated with the social commerce sites 250. As an example, the activity tracking system 124 may track individual user pages in a social media site such as Facebook, activity stream activity, word press comments, and social media users registering for access to an individual social commerce site 250. In these and other embodiments, the activity tracking system 124 likewise tracks activity associated with web sites 'A' 258 through 'n' 262. As an example a user of a social media site 256 may in turn go to an individual social commerce site 250 to make a purchase, and from there be redirected to a vendor's site (e.g., individual web site 'A' 258 through 'n' 262) to complete the purchase. To further the example, In one embodiment, the activity tracking system 124 tracks purchase activity for products purchased at an individual web site 'A' 258 through 'n' 262 within a predetermined time period. In one embodiment, the activity tracking system generates reports related to activity associated with the plurality of social commerce sites 250, the plurality of social media sites 256, individual users of the social media sites 256 and the plurality of social commerce sites 250, and the products that were considered or purchased by individual users.

In various embodiments, the administrative web site 126 provides an interface to manage a plurality of vendor associates that use the SCRMS 118. In these and other embodiments, this interface provides individual vendor associates the govern capabilities to govern their respective social commerce sites 250, vendor affiliate programs, and social commerce marketplaces. In various embodiments, the governance capabilities comprises roles and rights management, which allows a vendor affiliate to decide who can manage, create, and administer individual social commerce sites 250, social commerce marketplaces, and various affiliate programs. Likewise, the governance capabilities comprises stewardship over programs, which defines a sub-governance structure and hierarchy for the SCRMS 118 across a plurality of organization structures such as individual business units and geographies. Reporting capabilities are likewise provided for each steward, as well as the ability to create, customize and manage individual social commerce sites 250 associated with one or more of the plurality of social media sites 256. Likewise, the governance capabilities comprise the ability to create, run, manage, and monitor different social commerce marketing, promotion and advertising campaigns across the plurality of social media sites 256 to a predetermined user or group of users. A communication mechanism is likewise provided to allow one-way or two-way communication to facilitate announcements and frequently asked answers and questions (FAQs). The governance capabilities likewise comprise the ability to manage multiple product catalogs, as well as who has access to each product catalog and the products that are made available to different users of the SCRMS 118.

Likewise, the governance capabilities include the ability to enable in-house or outsourced moderation of user comments submitted to both individual social commerce sites 250 and content produced by social commerce site operators, such as vendor affiliates. The governance capabilities likewise include the ability to control branding of individual social commerce sites 250 such that they may variously be customized of restricted to a predetermined template. In various embodiments, branding applies to content that can be added and advertisement that can be used at individual social commerce sites 250. Likewise, the governance capabilities include the ability to manage users of individual social commerce sites 250 and their associated social media site(s) 256. Likewise, the ability to create, manage, and report on different vendor affiliate and vendor affiliate programs is provided by the governance capabilities. The governance capabilities likewise include the ability to create, manage, and report on various commission reputation and reward programs across different users of the plurality of social media sites 256 and the plurality of social commerce sites 250, as well as individual vendor affiliates. Likewise, the governance capabilities provide the ability to create, manage, and report on various support programs that may be customized for implementation within individual social commerce sites 250 to optimize use of the SCRMS 118.

In various embodiments, the developer service 128 provides the ability for operators of the plurality of social commerce sites 250 to use a developer kit to create, and then upload, templates for implementation within individual social commerce sites 250. Likewise, the developer service 128 provides the means to implement predetermined template functionalities by adding new widgets to different templates. The developer service 128 likewise provides the ability to maintain operational integrity of existing templates by specifying where the widget should, and can, be added. In these and other embodiments, the developer service 128 provides the means to create custom templates and widgets that can in turn be marketed to operators of the plurality of social commerce sites 250. Likewise, the developer service 128 provides the means for integration of the SCRMS 118 into other customer relationship management (CRM), inventory management, marketing automation, social network, and content management systems.

In various embodiments, the recommendation system 130 provides recommendations to operators of individual social commerce sites 250 regarding advertisements, products, and content that should be displayed to a user of an individual social commerce site 250, based upon an individual user's location, activity, and other associated data. Likewise, the recommendation system 130 provides recommendations related to products that an operator of an individual social commerce site 250 could sell, based on the demographic of users that come to the individual social commerce site 250. The recommendation system 130 likewise provides recommendations related to maximizing sales based on products that can be sold, advertising campaigns that can be run, and additional individual social commerce sites 250 that could be implemented In various embodiments, the central profile system 132 provides a profile for each vendor affiliate or operator of individual social commerce sites 250 that assists users of the individual social commerce sites be aware of the respective reputation of each of the individual social commerce sites 250 and their operators. Likewise, the central profile system 132 assists vendor affiliates and operators of individual social commerce sites 250 discover the products that they should sell while also providing the ability for buyers to market products to other trusted parties through their profile page. The central profile system 132 likewise provides the means to incent sellers and social media community members to be successful in their social commerce activities with targeted marketing and sales campaigns, while simultaneously maintaining and improving their respective reputations and profiles.

In various embodiments, the social monitoring service 134 provides the ability to monitor activity within the plurality of social commerce sites 250, and the plurality of social media sites 256, and associate rules respective to individual activities while likewise reporting on individual activities. Likewise, the social monitoring service 134 provides the ability to monitor potential fraud or dangers to the SCRMS 118 based on prior experience and activity by a specific user or group of users of individual social commerce sites 250. The social monitoring service 134 likewise provides the ability to monitor activity and look for trends that may lead to decisions related to which products need to be sold, risk and fraud that may be occurring, demand projections, and sales opportunities associated with individual social commerce sites 250. In various embodiments, the widget framework system 138 provides the ability for various widgets to be created for individual social commerce sites 250 such that they may be easily embedded into a template. In these and other embodiments, widgets are governed and administrators can decide who has control over the various widgets, which can likewise be implemented in various templates. Likewise, the widget framework system 138 provides the ability for developers to create customized widgets, which in turn have the ability to import and export data to other systems. In various embodiments, the social data repository 240 comprises data captured the plurality of social commerce sites 250, sites associated with the plurality of social commerce sites 250, affiliate commerce sites where a purchase transaction can occur, such as web sites 'A' 258 through 'n' 262, and other systems that choose to share data with the social data repository 240. In these and other embodiments, data stored in the social data repository 240 can be used to create graphs and charts that illustrating trends that assist operators of individual social commerce sites 250 in maximizing their sales.

Figure 3:
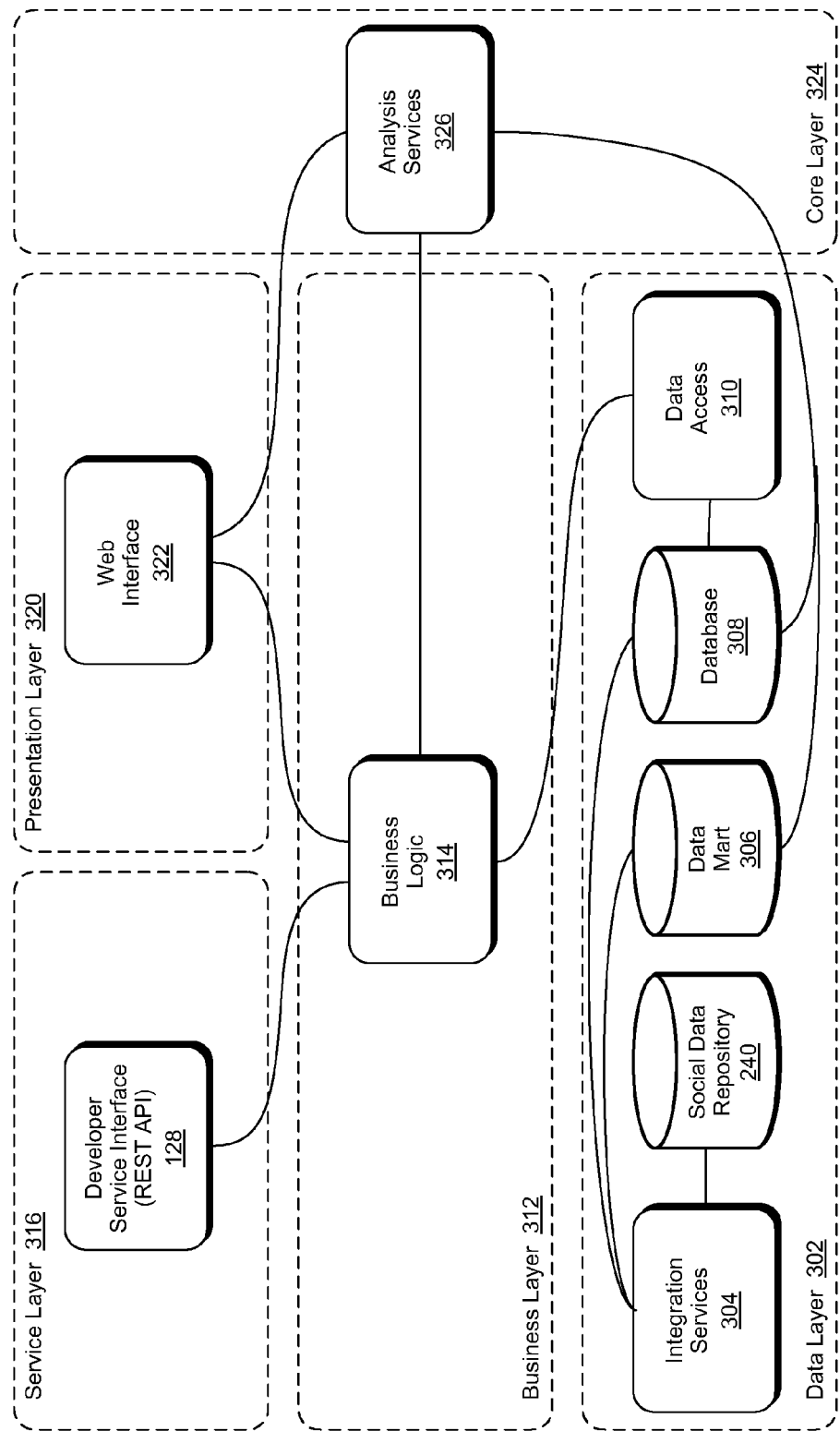
FIG. 3 is a simplified block diagram showing a generalized architecture of a SCRMS.

FIG. 3 is a simplified block diagram showing a generalized architecture of a social customer relationship management system (SCRMS) as implemented in an embodiment of the invention. In this embodiment, the SCRMS architecture comprises a service layer 316, further comprising a developer service 128, which in turn comprises a Representational State Transfer (REST) application program interface. The SCRMS architecture likewise comprises a presentation layer 320, further comprising a web interface component 322, a business layer 312, further comprising business logic component 314, and a core layer 324, further comprising analysis services component 326. Likewise, the SCRMS architecture comprises a data layer 302, further comprising integration services component 304, a social data repository 240, a data mart 306, a SCRMS database 308, and a data access component 310.

In various embodiments, the web interface component 322 provides users access to services and data available in the SCRMS and other interoperable systems as shown in FIG. 2. In these and other embodiments, the web interface component 322 likewise provides access to the business logic component 314 and to the analysis services 326 component. Likewise, the developer services interface component 128 provides an interface for external systems and applications to access various services and data available in the SCRMS, including the business logic component 314. The business logic 314, which is coupled to data access 310 and to analysis services 326, provides support for locating, searching, and accessing data and service objects that are available in the SCRMS. In various embodiments, the business logic 314 enables decoupling the location, search and access functions from various components performing data access, service interface, and web interface functions. As a result, a variety of search and access needs may be accommodated.

The data access component 310, supports the translation, mapping, caching, and access of data available in the SCRMS database 308. In various embodiments, the data access component 310 decouples the translation, mapping, caching, and access functions from the various SCRMS components performing business logic and data storage functions. As a result, a variety of internal and external data sources can be accommodated while likewise providing scalability as additional data sources are identified and added to the SCRMS. Likewise, the integration services component 304 provides the ability to ingest data from external systems, services, and data stores for storage in the social data repository 240. In addition, the integration services component 304 provides extraction, transformation, mapping, and aggregation functions to move data between the social data repository 240, the data mart 306, and the SCRMS database 308.

In various embodiments, the analysis services component 326 provides business intelligence components used by the SCRMS. Using data stored in the data mart 306 and the SCRMS database 308, these business intelligence components provide the means for the creation and management of multidimensional data cubes, clustering analysis, association analysis, and other data analyses. In these and other embodiments, the data mart 306 contains the de-normalized data obtained from the social data repository 240 and the SCRMS database 308 in a persistent fashion. The data mart 306 likewise provides search and retrieval access to this data, supports the administration of the data, and supports business intelligence functions from the analysis services component 326. Likewise, the SCRMS database 308 stores SCRMS-related data in a persistent fashion, provides search and retrieval access to this data, and supports administration of the data.

Figure 4:
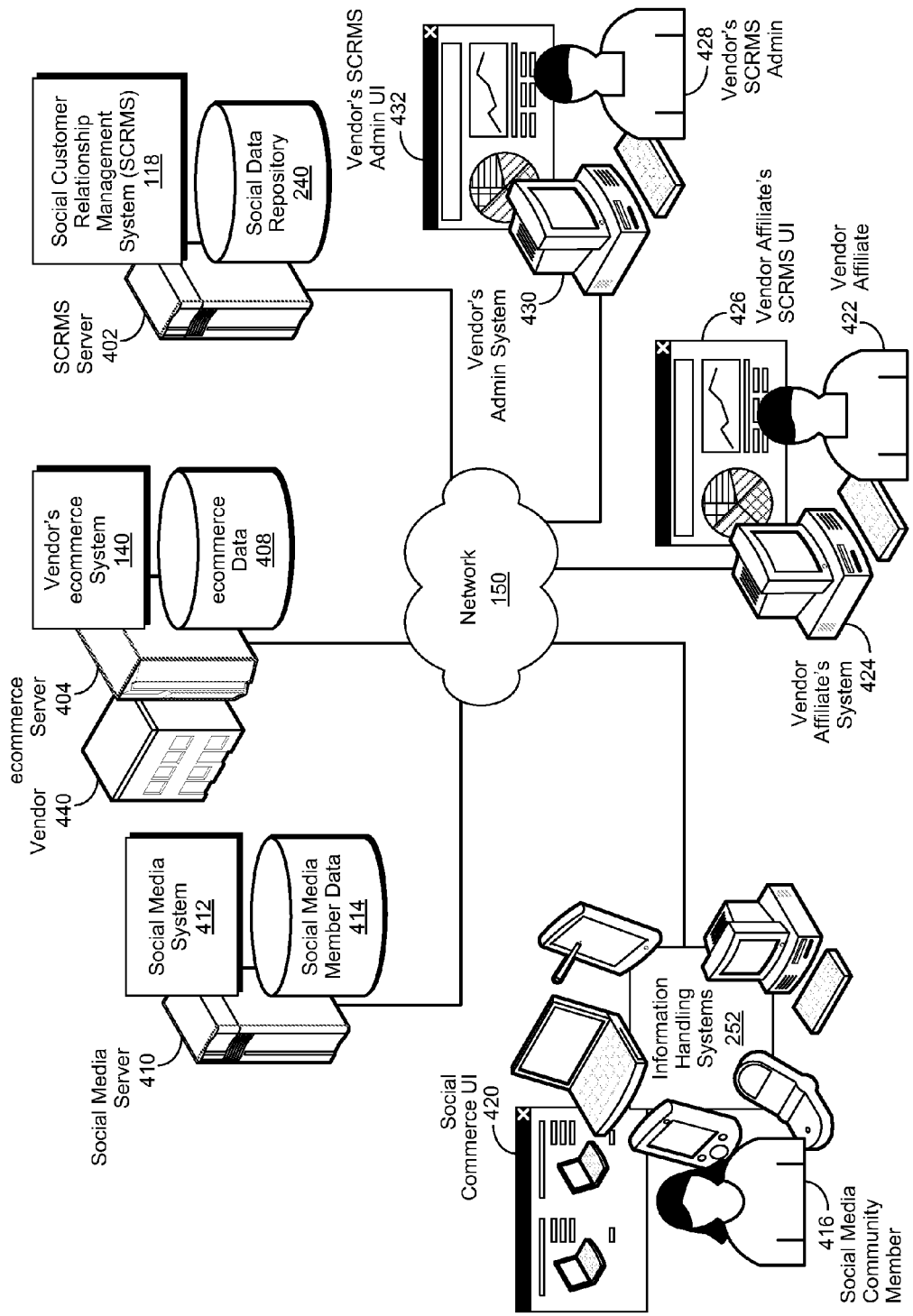
FIG. 4 is a simplified block diagram showing the implementation of a SCRMS to perform social commerce operations within a social media environment.

FIG. 4 is a simplified block diagram showing the implementation of a social customer relationship management system (SCRMS) in accordance with an embodiment of the invention to perform social commerce operations within a social media environment. In various embodiments of the invention, an SCRMS 118 is implemented to perform social commerce operations within a social media environment. In these and other embodiments, a social media community member 416 uses an information handling system 252 to log on to a social media environment, or site, enabled by a social media system 412, which is implemented on a social media server 410.

As used herein, information handling system 252 may comprise a personal computer, a laptop computer, or a tablet computer operable to exchange data between the social media community member 416 and the social media server 410 over a connection to network 150. The information handling system 252 may also comprise a personal digital assistant (PDA), a mobile telephone, or any other suitable device operable to display a social commerce user interface (UI) 420 and likewise operable to establish a connection with network 140. In various embodiments, the information handling system 252 are likewise operable to establish an on-line session over network 140 with the SCRMS 118, which is implemented on an SCRMS server 402.

Once the social media community member 416 has established a connection to the social media environment, or site, social media interactions such as reading or posting comments, participating in activity streams, uploading photographs, etc. are performed. In various embodiments, these interactions are stored in a repository of social media member data 414. During the course of performing social media interactions, the social media community member 416 may elect to interact with an activity stream related to a product available for sale by a vendor 440. If so, then the social media community member 416 may also elect to consider purchasing the vendor's product referenced in the activity stream. If so, then the social media community member 416 proceeds to the vendor's, or a vendor affiliates', social commerce site, while they are still performing social media interactions within the social media environment.

In various embodiments, the social commerce site is provided by the SCRMS 118. In one embodiment, the social commerce web site is a subset of an electronic commerce web site provided by the vendor's electronic commerce (ecommerce) system 140. In another embodiment, the social commerce web site is a stand-alone site that uses vendor and product information stored in a repository of ecommerce data 408 that is provided by the vendor's ecommerce system. Skilled practitioners of the art will recognize that many such embodiments are possible and the foregoing is not intended to limit the spirit, scope, or intent of the invention.

The social commerce site is then accessed by the social media community member 416. Once the social commerce site is accessed, social commerce operations are performed, such as selecting and purchasing the vendor's 440 product referenced in the activity stream. In one embodiment, the social commerce site, is configured and operated by a vendor's SCRMS administrator (admin) 428 using a corresponding vendor's SCRMS admin UI 432 implemented on the vendor's admin system 430 to access data stored in the social data repository 240. In another embodiment, the social commerce site, is configured by a vendor's affiliate 422 using a corresponding vendor affiliate's SCRMS UI 426 implemented on the vendor affiliate's admin system 424 to likewise access data stored in the social data repository 240.

Figure 5:
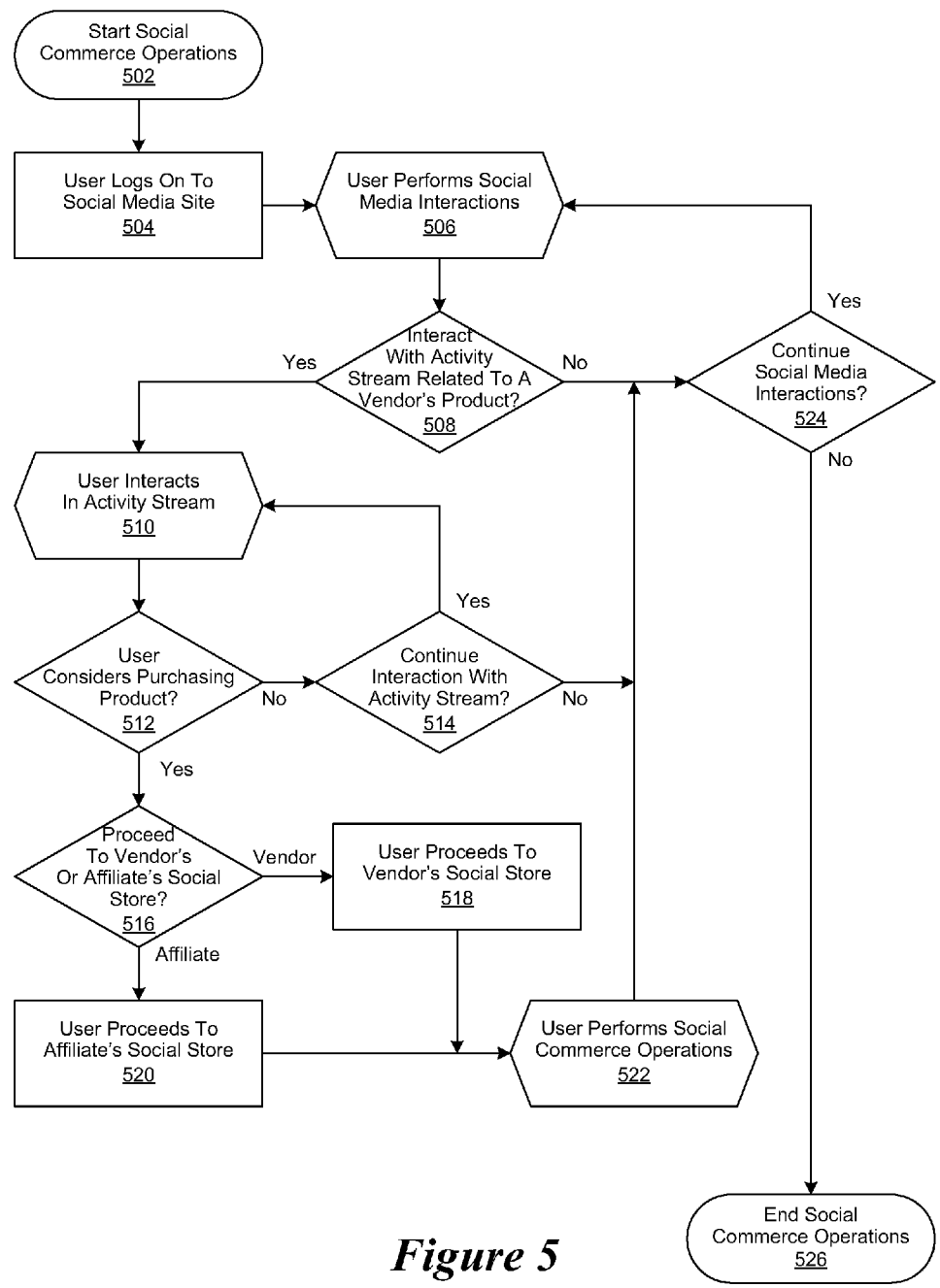
FIG. 5 is a generalized flow chart of the operation of a SCRMS to perform social commerce operations within a social media environment.

FIG. 5 is a generalized flow chart of the operation of a SCRMS as implemented in accordance with an embodiment of the invention to perform social commerce operations within a social media environment. In this embodiment, social commerce operations are begun in step 502, followed by a user logging on to a social media site in step 504. In step 506, the user performs social media interactions such as reading or posting comments, participating in activity streams, uploading photographs, etc. A determination is then made in step 508 whether the user elects to interact with an activity stream related to a vendor's product. If not, then a determination is made in step 524 whether to continue social commerce operations. If so, then the process is continued, proceeding with step 506. Otherwise, social commerce operations are ended in step 526.

However, if it is determined in step 508 that the user elects to participate in the activity stream, then the user so participates in step 510, followed by a determination being made in step 512 whether to consider purchasing a vendor's product referenced in the activity stream. If not, then a determination is made in step 514 whether to continue interaction with the activity stream. If so, then the process is continued, proceeding with step 510. Otherwise then a determination is made in step 524 whether to continue social commerce operations. If so, then the process is continued, proceeding with step 506. Otherwise, social commerce operations are ended in step 526.

However, if it is determined in step 512 that the user is considering purchasing the vendor's product referenced in the activity stream, then a determination is made in step 516 whether to proceed to either the vendor's, or a vendor affiliate's, social store. If it is determined in step 516 to proceed to the vendor's social store, then the user proceeds to the vendor's social store in step 518. Otherwise, the user proceeds to the vendor affiliate's store in step 520. Once the user has respectively proceeded to either the vendor's, or the vendor affiliate's, social store in steps 518 and 520, the user performs social commerce operations in step 522, such as selecting and purchasing the vendor's product referenced in the activity stream. Once social commerce operations are completed in step 522, a determination is made in step 524 whether to continue social commerce operations. If so, then the process is continued, proceeding with step 506. Otherwise, social commerce operations are ended in step 526.

Figure 6:
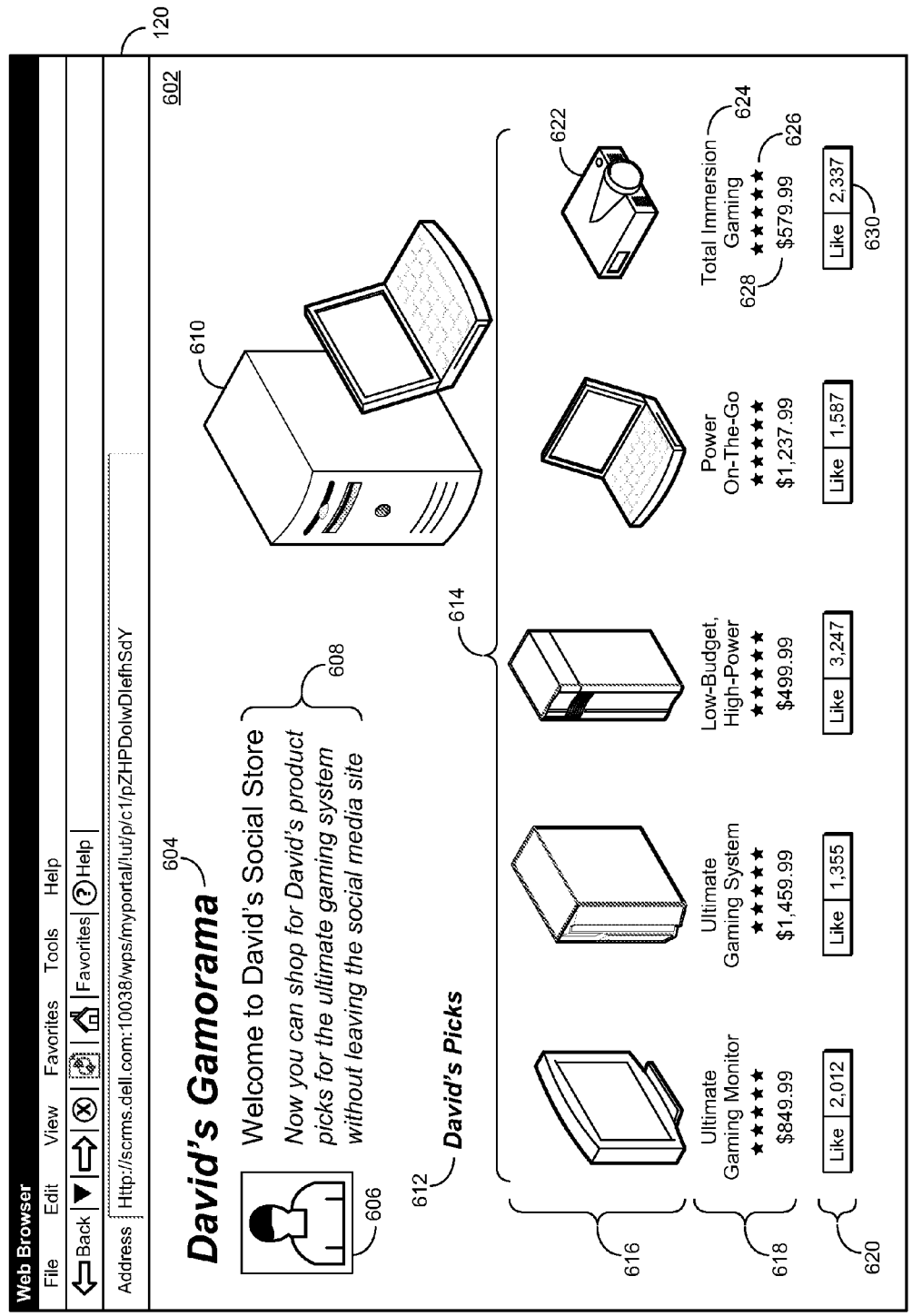
FIG. 6 shows the implementation of a SCRMS to render a social commerce site within a graphical user interface.

FIG. 6 shows the implementation of a social customer relationship management system (SCRMS) in accordance with an embodiment of the invention to render a social commerce site within a graphical user interface. In various embodiments of the invention, an SCRMS is implemented to perform social commerce operations within a social media environment. In these and other embodiments, a social commerce site is accessed by a user, such as a member of a social media community, from within a social media environment. In one embodiment, the social commerce site is configured and operated by a vendor. In another embodiment, the social commerce site is configured by the affiliate, but operated by the vendor.

In this embodiment, a social commerce site is rendered within a window 602 of a user interface, such as web browser 120. As shown in FIG. 6, the social commerce site comprises a heading 604 referencing an affiliate of a vendor, an image of the affiliate 606, a sub-heading 608, and a graphical image 610 corresponding to the vendor associated with the affiliate. As likewise shown in FIG. 6, the social commerce site likewise comprises a notation 612 referencing a plurality of vendor's products 614 recommended by the affiliate. The plurality of recommended products 614 respectively comprises a graphical image 616, a product description 618, and an approval rating 620. As an example, the graphical image 622 has a corresponding product name 624 of "Total Immersion Gaming", a rating 626 of "five stars", a price of '$579.99" and approval rating 630 of '2,337' reviewers.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for conducting electronic commerce within a social media environment comprising:

enabling generation of a plurality of a social commerce sites, each of the plurality of social commerce sites comprising product data, wherein each of the plurality of social commerce sites is operable to perform electronic commerce operations and the product data is associated with a vendor of the product;

performing, via a computer system, governance operations on the plurality of social commerce sites, the governance operations comprising roles and rights management;

accessing at least some of the social commerce sites within the social media environment, wherein the accessing is performed by a user of the social media environment; and receiving social commerce input data from the user of the social media environment, wherein the social commerce input data is processed to perform electronic commerce operations associated with the product; and, providing a social customer relationship management system, the social customer relationship management system comprising instruction for performing the enabling, performing, accessing and receiving, the social customer relationship management system comprising a service layer, a presentation layer, a business layer, a core layer and a data layer, the services layer comprising a Representation State Transfer application program interface, the presentation layer comprising a web interface component, the business layer comprising a business logic component, the core layer comprising an analysis services component and the data layer comprising an integration services component and a social data repository.

2. The method of claim 1, wherein the social commerce site is configured by the vendor of the product.

3. The method of claim 1, wherein the social commerce site is configured by an affiliate of the vendor of the product.

4. The method of claim 1, wherein the social commerce site is operated as a subset of an electronic commerce site operated by the vendor.

5. The method of claim 1, wherein the social commerce site is operated independently from an electronic commerce site operated by the vendor.

6. The method of claim 1, wherein the electronic commerce operations comprise purchasing the product.

7. The method of claim 1, wherein the governance operations comprise stewardship over programs;

an ability to create, run, manage and monitor the plurality of social commerce sites; and, an ability to manage a plurality of product catalogs.

8. The method of claim 1, wherein the governance operations comprise enabling moderation of user comments;

controlling branding of individual social commerce sites;
an ability to manage users of the individual social commerce sites;
an ability to create, manage and report of affiliate programs;
an ability to create, manage and report on commission, reputation and reward programs across the plurality of social commerce sites; and,
an ability to create, manage and report on support programs customized for at least one of the plurality of social commerce sites.

9. A system comprising:
a processor;
a data bus coupled to the processor; and
a computer-usable medium embodying computer program code, the computer-usable medium being coupled to the data bus, the computer program code interacting with a plurality of computer operations and comprising instructions executable by the processor and configured for:
enabling generation of a plurality of a social commerce sit s, each of the plurality of social commerce sites comprising product data, wherein each of the plurality of the social commerce sites is operable to perform electronic commerce operations and the product data is associated with a vendor of the product;
performing governance operations on the plurality of social commerce sites, the governance operations comprising roles and rights management;
accessing at least some of the social commerce sites within the social media environment, wherein the accessing is performed by a user of the social media environment;
receiving social commerce input data from the user of the social media environment, wherein the social commerce input data is processed to perform electronic commerce operations associated with the product; and,
providing a social customer relationship management system, the social customer relationship management system comprising instruction for performing the enabling, performing, accessing and receiving, the social customer relationship management system comprising a service layer, a presentation layer, a business layer, a core layer and a data layer, the services layer comprising a Representation State Transfer application program interface, the presentation layer comprising a web interface component, the business layer comprising a business logic component, the core layer comprising an analysis services component and the data layer comprising an integration services component and a social data repository.

10. The system of claim 9, wherein the social commerce site is configured by the vendor of the product.

11. The system of claim 9, wherein the social commerce site is configured by an affiliate of the vendor of the product.

12. The system of claim 9, wherein the social commerce site is operated as a subset of an electronic commerce site operated by the vendor.

13. The system of claim 9, wherein the social commerce site is operated independently from an electronic commerce site operated by the vendor.

14. The system of claim 9, wherein the electronic commerce operations comprise purchasing the product.

15. A non-transitory computer-usable medium embodying computer program code, the computer program code comprising computer executable instructions configured for:
enabling generation of a plurality of a social commerce sites, each of the plurality of social commerce sites comprising product data, wherein each of the plurality of the social commerce site is operable to perform electronic commerce operations and the product data is associated with a vendor of the product;
performing governance operations on the plurality of social commerce sites, the governance operations comprising roles and rights management;
accessing at least some of the social commerce sites within the social media environment, wherein the accessing is performed by a user of the social media environment;
receiving social commerce input data from the user of the social media environment, wherein the social commerce input data is processed to perform electronic commerce operations associated with the product; and,
providing a social customer relationship management system, the social customer relationship management system comprising instruction for performing the enabling, performing, accessing and receiving, the social customer relationship management system comprising a service layer, a presentation layer, a business layer, a core layer and a data layer, the services layer comprising a Representation State Transfer application program interface, the presentation layer comprising a web interface component, the business layer comprising a business logic component, the core layer comprising an analysis services component and the data layer comprising an integration services component and a social data repository.

16. The computer usable medium of claim 15, wherein the social commerce site is configured by the vendor of the product.

17. The computer usable medium of claim 15, wherein the social commerce site is configured by an affiliate of the vendor of the product.

18. The computer usable medium of claim 15, wherein the social commerce site is operated as a subset of an electronic commerce site operated by the vendor.

19. The computer usable medium of claim 15, wherein the social commerce site is operated independently from an electronic commerce site operated by the vendor.

20. The computer usable medium of claim 15, wherein the electronic commerce operations comprise purchasing the product.

21. The computer usable medium of claim 15, wherein the computer executable instructions are deployable to a client computer from a server at a remote location.

22. The computer usable medium of claim 15, wherein the computer executable instructions are provided by a service provider to a customer on an on-demand basis.

* * * * *